US 6,626,450 B2

United States Patent
Braun et al.

(10) Patent No.: US 6,626,450 B2
(45) Date of Patent: Sep. 30, 2003

(54) BUMPER UNIT HAVING A HITCHING TOWING ARRANGEMENT AND A METHOD OF MAKING SAME

(75) Inventors: Walter Braun, Sindelfingen (DE); Eberhard Palmer, Vaihingen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/007,661

(22) Filed: Dec. 10, 2001

(65) Prior Publication Data
US 2002/0113408 A1 Aug. 22, 2002

(30) Foreign Application Priority Data

Dec. 9, 2000  (DE) .......................... 100 61 491

(51) Int. Cl.⁷ .............................. B60D 1/50; B60D 1/56
(52) U.S. Cl. ..................................... 280/500
(58) Field of Search ................. 280/500, 495, 280/502, 491.5; D12/162

(56) References Cited

U.S. PATENT DOCUMENTS

| 2,097,006 | A |   | 10/1937 | Weis |  |
|---|---|---|---|---|---|
| 2,747,892 | A | * | 5/1956 | Jones | 280/491.5 |
| 4,385,779 | A |   | 5/1983 | Kimura et al. |  |
| 4,475,856 | A | * | 10/1984 | Tomingas | 411/33 |
| 5,094,469 | A | * | 3/1992 | Yamamoto et al. | 280/500 |
| 5,149,122 | A | * | 9/1992 | Helber | 280/295 |
| 5,476,279 | A | * | 12/1995 | Klemensten | 280/495 |
| 5,511,813 | A | * | 4/1996 | Kravitz | 280/495 |
| 5,561,246 | A | * | 10/1996 | Gruber et al. | 73/504.11 |
| 5,598,589 | A | * | 2/1997 | Frettoli | 4/236 |
| 5,603,191 | A | * | 2/1997 | Wu | 52/204.1 |
| 6,173,984 | B1 | * | 1/2001 | Kay | 280/495 |
| 6,234,512 | B1 | * | 5/2001 | Bettenhausen | 280/495 |
| 6,402,179 | B1 | * | 6/2002 | Morris et al. | 280/495 |

FOREIGN PATENT DOCUMENTS

| DE | 3233813 C1 |   | 11/1983 |
|---|---|---|---|
| DE | 290834 A | * | 6/1991 |
| DE | 4131275 |   | 3/1993 |
| DE | 19603873 |   | 8/1997 |
| DE | 19603873 A1 |   | 8/1997 |
| EP | 1008468 |   | 6/2000 |
| GB | 2032052 |   | 4/1980 |
| GB | 2147257 |   | 5/1985 |

* cited by examiner

Primary Examiner—Lesley D. Morris
Assistant Examiner—Matt Luby
(74) Attorney, Agent, or Firm—Crowell & Moring LLP

(57) ABSTRACT

A hitching towing arrangement for a motor vehicle is connected with a rear-side cross member. The arrangement forms a bumper unit and is provided with a deformation element. The cross member is connected by way of holders with side members of the vehicle body. The holders can be fastened by way of expansion screws to the side members.

18 Claims, 3 Drawing Sheets

BUMPER UNIT HAVING A HITCHING TOWING ARRANGEMENT AND A METHOD OF MAKING SAME

BACKGROUND AND SUMMARY OF THE INVENTION

This application claims the priority of German Application DE 100 61 491.4, filed Dec. 9, 2000, the disclosure of which is expressly incorporated by reference herein.

The invention relates to a bumper unit having a hitching towing arrangement.

From German Patent Document DE 32 33 813 C1, a hitching coupling device for vehicles is disclosed whose ball neck is fastened to a cross member and the cross member is connected with at least one shock-absorbing foam body. Furthermore, a hitching arrangement is disclosed in German Patent Document DE 196 03 873 A1 which comprises a cross member which is connected with the arrangement and which can be connected with side members of the vehicle body by way of connection brackets. This connection takes place by means of bolts arranged transversely to the vehicle.

It is an object of the invention to provide a hitching towing arrangement in a rear-side bumper of a vehicle which ensures a durably fixed connection with the vehicle body when loaded.

According to the invention, this object is achieved by fastening the hitching towing arrangement to a rear-side cross member connected with a body structure of the vehicle, and fixedly connecting the cross member on each end side with one holder, respectively. Each holder, together with the cross member, can be fastened as a constructional unit by way of expansion screws arranged in the longitudinal direction of the vehicle on a vehicle body part.

Several of the principal advantages achieved by way of the invention are that the cross member holding the hitching towing arrangement can be connected by way of the expansion screws with the vehicle body, for example, with side members of the vehicle body, such that, as a result of different tension loads and pressure loads, no loosening of the fastening screws can take place because of a so-called vibration-caused loosening, and a durable fixed connection of the cross member on the vehicle body structure is ensured.

For this purpose, the cross member is fixedly connected on the end side with one holder respectively, in which case each holder, together with the cross-member, can be fastened as a constructional unit by way of expansion screws arranged in the longitudinal direction to a vehicle body component. The expansion screws ensure that, in the case of loads in the trailer operation, a durably fixed connection is achieved. The holder for the connection with the cross member has outer and inner pairs of arms on its vertically oriented sides which reach over and under the cross member and which are connected with the cross member in a preferably material-locking manner.

The outer pairs of arms of the holder are preferably constructed to be bent away from a base plate, the additional inner pairs of arms being arranged in an tilted manner at an obtuse angle with respect to the cross member.

So that a frictionless expansion of the fastening screw can take place in the barrel in the trailer operation, the fastening screw is arranged along a certain length to be unencumbered with respect to the surrounding sleeve, so that the expansion cannot be hindered.

The sleeves are fastened to the holder, for example, by welding, and the expansion screws are in each case arranged above and below the cross member between the lateral pairs of arms of the holder. Preferably, two expansion screws respectively are provided above the cross member and two additional expansion screws are arranged below the cross member in a side-by-side and superimposed arrangement respectively.

For using the cross member simultaneously as a bumper, the cross member is advantageously provided on its side facing away from the vehicle with a deformation member extending approximately along the length of the cross member. This deformation member consists of a U-shaped profile constructed in the cross member and is connected with the cross member by way of screwing devices or is connected with the side member by way of screwing devices.

Other objects, advantages and novel features of the present invention will become apparent from the following detailed description of the invention when considered in conjunction with the accompanying drawings.

DETAILED DESCRIPTION OF THE DRAWINGS

Figure 1:
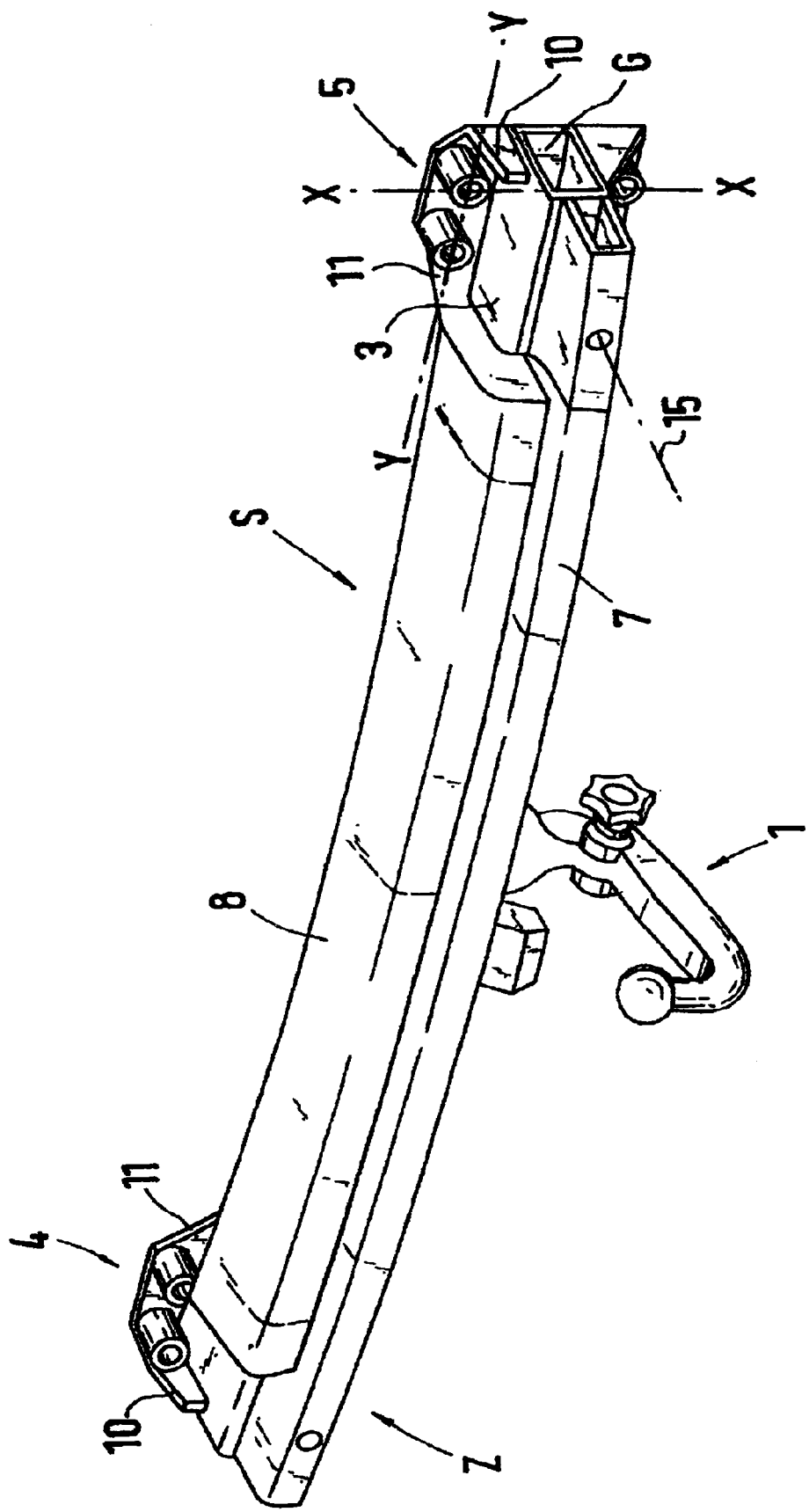
FIG. 1 is a perspective view of a bumper unit of a motor vehicle including a rear-side cross member with a hitching towing arrangement, as well as a deformation member and a holder with sleeves for expansion screws.
Figure 2:
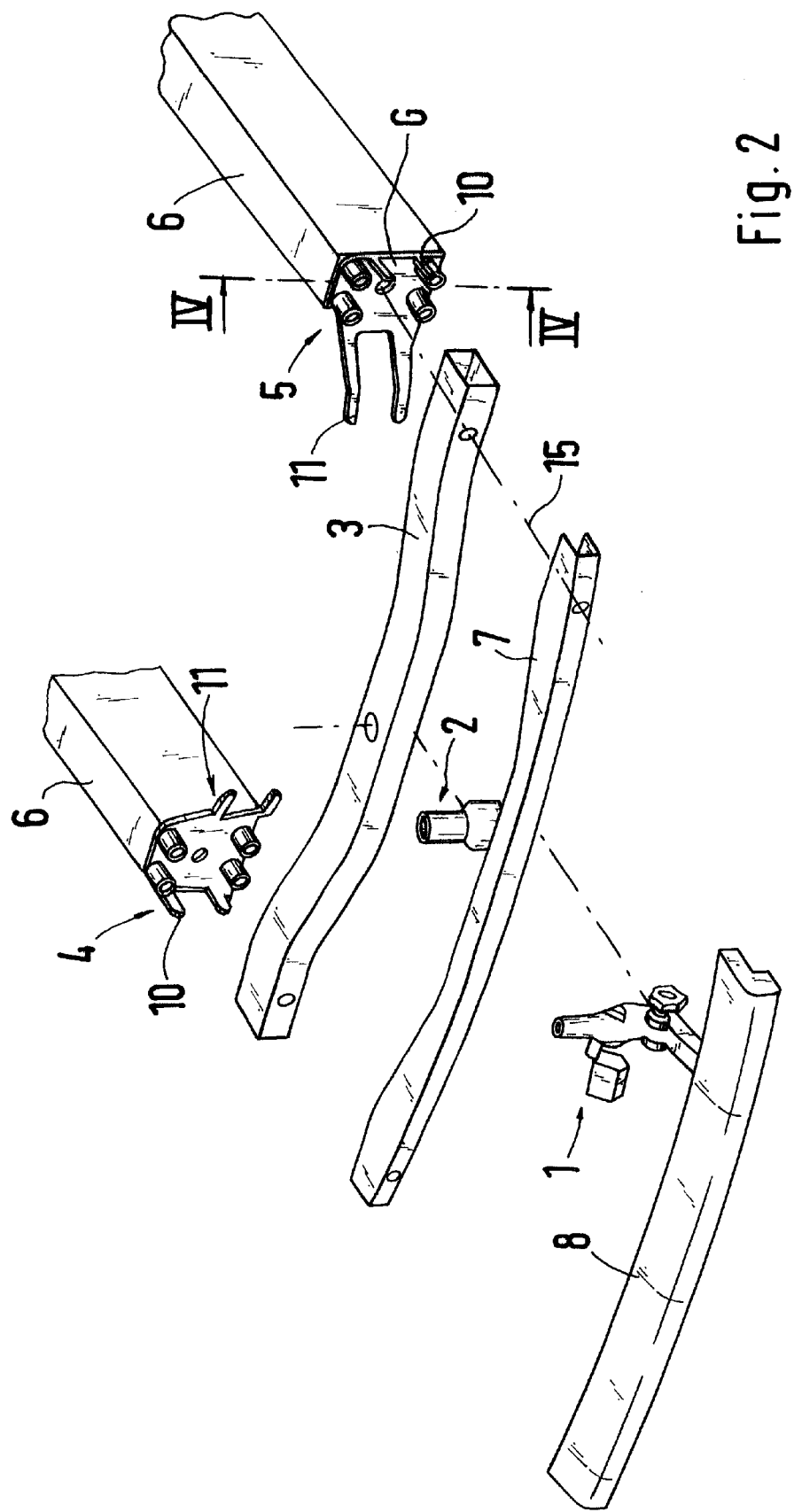
FIG. 2 is an exploded view of the bumper unit with individually illustrated holders, a cross member, a deformation member and a hitching towing arrangement.
Figure 3:
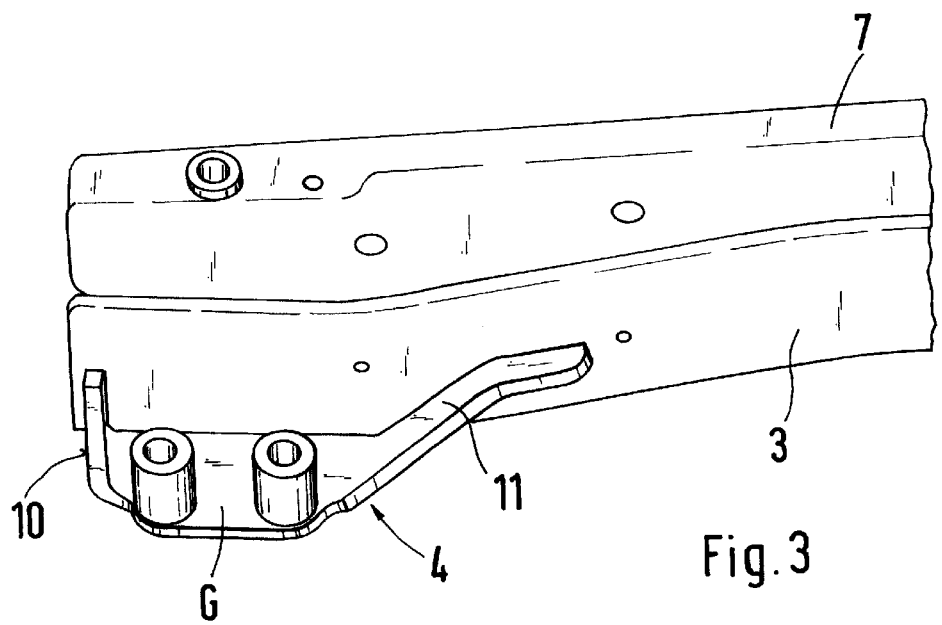
FIG. 3 is a view of a free end of the cross member with the holder and the mounted deformation member viewed in the direction of arrow Z of FIG. 1.

As illustrated in detail in FIG. 1, a hitching towing arrangement 1 is connected by way of a receiving device 2, which can be fitted into a cross member 3. The member 3 is fastened by way of holders 4, 5 arranged on the end side, in turn, to a vehicle body structure and to side members 6 of the vehicle respectively. A U-profile-shaped deformation member 7, which is covered on the top side by a foam part 8 for a foot step, which is not shown, is connected with the cross member 3.

The cross member 3, deformation member 7 and foam part 8 unit forms a rear-side bumper S with an integrated hitching towing arrangement 1.

The cross member 3 preferably includes a closed box profile which, at its free ends, can be connected with the holders 4, 5. For this purpose, each holder 4, 5 has inner and outer pairs of arms 10, 11 which are bent away at its vertical side edges and which reach over the member 3 from above and from below. A connection of these pairs 10, 11 of arms with the member 3 takes place, for example, by means of welding.

The holders 4, 5 are each connected with the side member 6 by way of expansion screws 12, for the purpose of which, for example, a thread element 13 or the like is fixedly inserted in the side member 6. The expansion screws 12 are arranged in sleeves 14 and are supported on the latter on the face side such that the cross member 3 and therefore the hitching towing arrangement 1 can be fixedly connected by way of these expansion screws 12 with the vehicle body and the side members 6 respectively.

The expansion screws 12 are arranged in the sleeve 14 in each case unencumbered with respect to the sleeve 14 along a certain length I, so that, in the case of a loading in the direction of the arrow P, the screw 12 can expand in the sleeve without friction and can contract again against this direction P of the arrow.

Two expansion screws 12 respectively are arranged above the cross member 3 and two additional expansion screws are arranged below the cross member 3 between the two pairs 10, 11 of arms. Two expansion screws 12 are in each case arranged preferably in a horizontal plane X—X and two additional expansion screws are arranged in a vertical plane Y—Y above one another.

A connection of the deformation member 7 with the side member 6 takes place, for example, by means of screw devices 15 which are schematically represented by a line.

Figure 4:
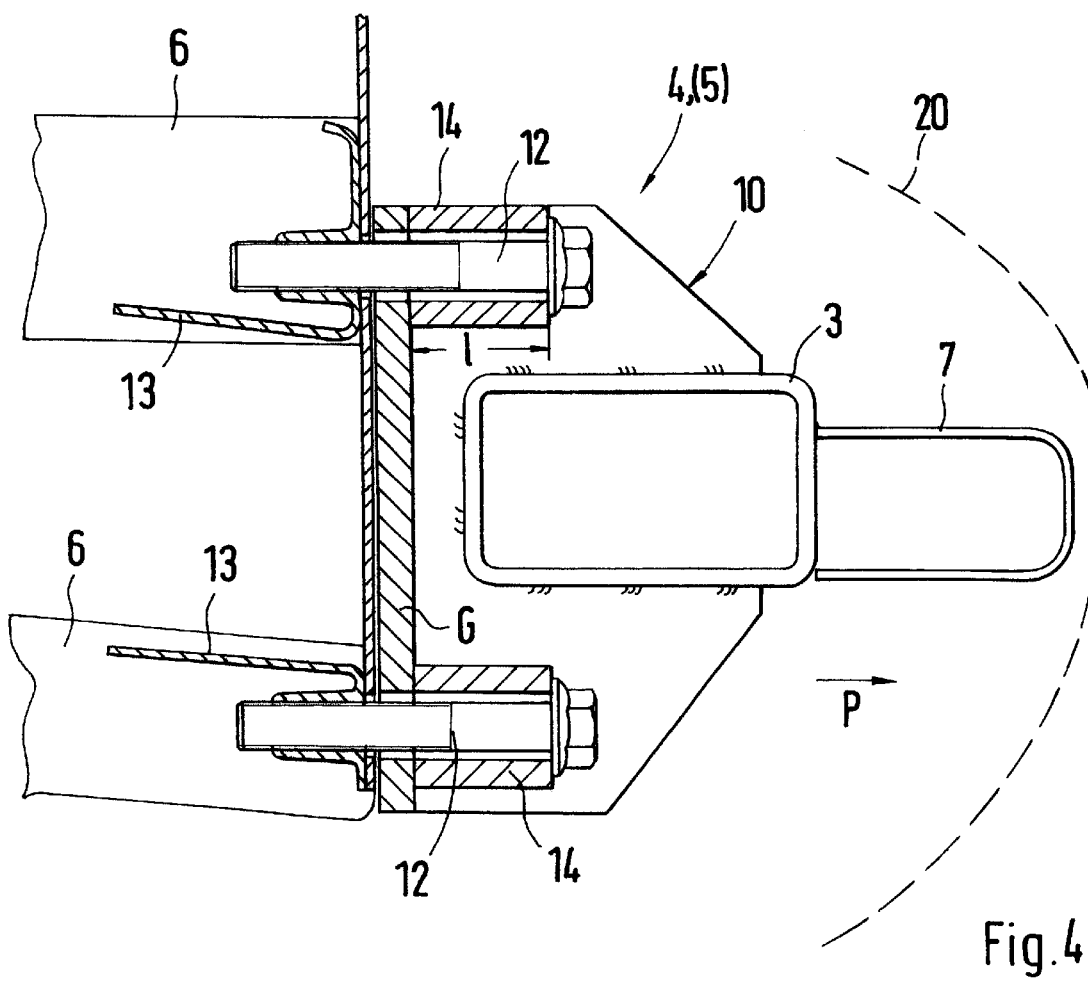
FIG. 4 is a sectional view of the holder having expansion screws according to Line IV—IV of FIG. 2

As illustrated in detail in FIG. 4, the cross member 3 has the preplaced deformation member 7 as a bumper unit which is surrounded by a so-called skin 20 or a preform.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hitching towing arrangement for a vehicle which is fastened to a rear-side cross member connected with a body structure of the vehicle, wherein the cross member is fixedly connected on each end side with one holder respectively, and each holder, together with the cross member, can be fastened as a constructional unit by way of necked-down bolts arranged in the longitudinal direction of the vehicle on a vehicle body part, said necked-down bolts being capable of being pre-tensioned.

2. The arrangement according to claim 1, wherein the cross member comprises a center receiving device for a ball pin of the hitching towing arrangement and, on a side facing away from the vehicle, is connected with a U-profile-shaped deformation member.

3. The arrangement according to claim 1, wherein, for the connection with the cross member, each holder has on a vertically oriented sides, outer and inner pairs of arms which reach over and under the cross member, which pairs of arms can be connected with the cross member in a material-locking manner.

4. The arrangement according to claim 1, wherein the necked-down bolts are each held in an unencumbered manner along a barrel length in a sleeve connected with the holder.

5. The arrangement according to claim 4, wherein the sleeves of the necked-down bolts are arranged in each case above and below the cross member between lateral pairs of arms of the holder.

6. The arrangement according to claim 3, wherein the outer pairs of arms of the holder are arranged bent away from a base plate and the additional inner pairs of arms are oriented in a tilted manner at an obtuse angle with respect to the cross member.

7. The arrangement according to claim 1, wherein two necked-down bolts respectively are arranged above the cross member and two additional necked-down bolts are arranged below the cross member in each holder in superimposed horizontal planes as well as in vertical planes.

8. The arrangement according to claim 1, wherein each holder, together with the cross member and a deformation member, can be fastened by way of screw devices on the vehicle body or side members of the vehicle body.

9. A bumper unit for a motor vehicle comprising:
a cross member comprising first and second end sides;
a hitching towing arrangement being operatively connected with the cross member; and
first and second holders each being fixedly connected with one of the first and second end sides of the cross member such that the first and second holders and the cross member are capable of being fastened as a unit to a vehicle body structure by way of necked-down bolts arranged in a longitudinal direction of the motor vehicle, said necked-down bolts being capable of being pre-tensioned.

10. The bumper unit according to claim 9, wherein the cross member comprises a center receiving device for receiving the hitching towing arrangement and is operatively connected with a U-shaped deformation member on a side of the cross member facing away from the motor vehicle.

11. The bumper unit according to claim 9, wherein the first and second holders each comprise inner and outer pairs of arms extending from vertical sides thereof, the inner and outer pairs of arms extending over and under the cross member to connect the cross member to the first and second holders.

12. The bumper unit according to claim 9, wherein a length of the necked-down bolts is surrounded in an untouching manner by sleeves which are secured against the first and second holders.

13. The bumper unit according to claim 12, wherein the sleeves surrounding the expansion screws are arranged above or below the cross member and between lateral pairs of arms extending from the first and second holders.

14. The bumper unit according to claim 11, wherein the outer pairs of arms of each of the holders are bent to extend away from a plane formed by a base plate of the holders, and the inner pairs of arms are bent to extend at an obtuse angle with respect to a longitudinal axis of the cross member.

15. The bumper unit according to claim 9, wherein two necked-down bolts are arranged above the cross member in a horizontal plane and two expansion screws are arranged below the cross member in a vertical plane.

16. The bumper unit according to claim 9, wherein a deformation member is fastened to the cross member and the first and second holders by screw devices.

17. A motor vehicle comprising:
a cross member comprising first and second end sides;
a hitching and towing arrangement being operatively connected with the cross member; and
first and second holders each being fixedly connected with one of the first and second end sides of the cross member such that the first and second holders and the cross member are fastened as a unit to a body structure of the motor vehicle by way of necked-down bolts arranged in a longitudinal direction of the motor vehicle, said necked-down bolts being capable of being pre-tensioned.

18. A method of making a bumper unit for a motor vehicle comprising:
providing a cross member comprising first and second end sides;
operatively connecting a hitching and towing arrangement with the cross member;
fixedly connecting each of first and second holders with one of the first and second end sides of the cross member to form a bumper unit; and
attaching the bumper unit to a vehicle body structure by way of necked-down bolts in a longitudinal direction of the motor vehicle,
wherein the necked-down bolts are capable of being pre-tensioned.

* * * * *